United States Patent Office 3,382,240
Patented May 7, 1968

3,382,240
PROCESS FOR PREPARING PYRIDINE
DERIVATIVES
Issei Iwai, Eijiro Ohki, and Tetsuo Miyadera, Tokyo,
Japan, assignors to Sankyo Company, Limited, Tokyo,
Japan
No Drawing. Filed Mar. 15, 1965, Ser. No. 439,992
Claims priority, application Japan, Mar. 20, 1964,
39/15,286
3 Claims. (Cl. 260—240)

ABSTRACT OF THE DISCLOSURE

Process for the preparation of 4-phenyl-1-(α-pyridyl)-1,3-butadiene derivatives. According to the process, quinazolizinium halogenide is reacted with a Grignard reagent or an organo lithium compound. 4-phenyl-1-(α-pyridyl)-1,3-butadiene derivatives are useful as ultraviolet absorbers. 4-phenylethynyl-1-(α-pyridyl)-1,3-butadiene and 6-phenyl - 1 - (α - pyridyl) - 1,3,5 - hexatriene are specifically claimed as new compounds.

SUMMARY OF THE INVENTION

This invention relates to a novel process for preparing pyridine derivatives and novel pyridine derivatives. More particularly, it relates to a novel process for preparing pyridine derivatives having the formula

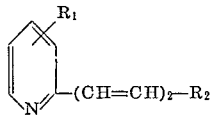

(I)

wherein $R_1$ represents hydrogen atom or alkyl containing from 1 to 5 carbon atoms such as methyl, ethyl, propyl or butyl groups and $R_2$ represents alkyl containing from 1 to 5 carbon atoms such as methyl, ethyl, propyl or butyl groups, aryl such as phenyl or naphthyl groups, alkenyl containing from 2 to 5 carbon atoms such as vinyl, propenyl or butenyl groups, alkynyl containing from 2 to 5 carbon atoms such as ethynyl or propynyl groups, aralkyl containing from 1 to 5 carbon atoms in the alkyl moiety such as benzyl or phenethyl groups, aralkenyl containing from 2 to 5 carbon atoms in the alkenyl moiety such as styryl or cinnamyl groups or aralkynyl containing from 2 to 5 carbon atoms in the alkynyl moiety such as phenylethynyl or phenylpropynyl groups. It relates also to pyridine derivatives having the above Formula I.

The pyridine derivatives having the above Formula I, except one (trans-trans isomer) where $R_1$ is hydrogen atom or methyl group at α'-position and $R_2$ is phenyl group, are novel compounds unknown in the prior art and useful as ultraviolet absorbing agents.

It is an object of this invention to provide a novel process for preparing the pyridine derivatives having the above Formula I. Another object of this invention is the provision of the novel pyridine derivatives having the above Formula I, except one where $R_1$ is hydrogen atom or methyl group at α'-position and $R_2$ is phenyl group, as useful ultraviolet absorbing agents.

Other objects of this invention will be apparent from the following detailed descriptions of the invention.

Heretofore, the synthetic method in case where $R_1$ is hydrogen atom or methyl group at α'-position and $R_2$ is phenyl group in the above Formula I, that is, of 4-phenyl - 1 - (α - pyridyl) - 1,3 - butadiene and 4 - phenyl-1 - (α' - methyl - α - pyridyl) - 1,3 - butadiene has been reported by E. Späth, G. Kunbiczeck et al. [Berichte Der Deutschen Chemischen Gesellschaft, volume 74, p. 873 (1941)]. According to the method of the said report, the above-specified two compounds have been prepared by the reaction of cinnamic aldehyde with α-picoline.

As a result of a variety of investigation, it has new been found that the pyridine derivatives having the above Formula I can be prepared by reacting a quinolizinium halogenide having the formula

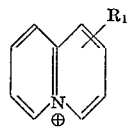

(II)

wherein $R_1$ has the same meanings as described above and X is halogen atom with a compound selected from the class consisting of a compound having the fomula $$R_2M_gX \quad (III)$$

wherein $R_2$ and X have the same meanings as described above and a compound having the formula $$R_2Li \quad (IV)$$

wherein $R_2$ has the same meanings as described above. The chemical reaction in accordance with the process of this invention is an entirely new type of the chemical reaction and may be represented by the following equation:

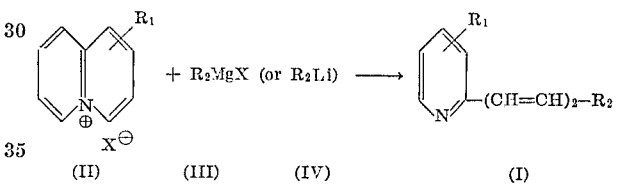

(II)          (III)          (IV)          (I)

in which $R_1$, $R_2$ and X have the same meanings as described above.

In carrying out the process of this invention, the quinolizinium halogenide having the above Formula II is reacted with the reactant having the above Formula III or IV in the presence of a solvent. As the solvent may be used any of the solvents being used for Grignard reaction, such as ethers, for example, ethylether, tetrahydrofuran or dioxane. The reaction may be conducted at a temperature from about 0 to 65° C. and usually at room temperature. The reaction time may be varied depending upon the starting material and reactant to be employed and generally is within the range of from about 1 to 24 hours.

After completion of the reaction, the reaction product may be recovered from the reaction mixture and purified by any of the conventional methods. For example, after completion of the reaction, aqueous ammonium chloride or water is added to the reaction mixture to decompose the unreacted reactant followed by extraction with a water-immiscible organic solvent such as benzene or ethers. The organic layer is extracted with a dilute acid such as dilute hydrochloric or sulfuric acid, the acid extract is made alkaline by addition of alkaline substance such as sodium carbonate or sodium hydroxide and then is again extracted with such water-immiscible organic solvent as set forth above. The extract is washed with water, dried over anhydrous sodium sulfate and the solvent is distilled off. The residue is purified by recrystallization from a suitable solvent such as methanol or ethanol or by column-chromatography of the benzene solution thereof.

The following compounds are representative of those contemplated by this invention and which may be prepared by the procedure set forth hereinabove.

4-phenyl-1-(α-pyridyl)-1,3-butadiene;
4-phenyl-1-(β-methyl-α-pyridyl)-1,3-butadiene;
4-phenyl-1-(α-methyl-α-pyridyl)-1,3-butadiene;
6-phenyl-1-(α-pyridyl)-1,3,5-hexatriene;
6-phenyl-1-(β-ethyl-α-pyridyl)-1,3,5-hexatriene;
4-phenylethynyl-1-(α-pyridyl)-1,3-butadiene;
4-phenylethynyl-1-(β-methyl-α-pyridyl)-1,3-butadiene;
1-(α-pyridyl)-1,3-pentadiene.

The following examples are given by way of illustration of this invention, but are not intended to be limiting on the scope thereof.

Example 1.—4-phenyl-1-(α-pyridyl)-1,3-butadiene

To a suspension of 6.3 g. of quinolizinium bromide in 50 ml. of anhydrous tetrahydrofuran is added dropwise a Grignard reagent (phenyl magnesium bromide) prepared from 120 ml. of tetrahydrofuran, 9.6 g. of bromobenzene and 1.46 g. of magnesium with stirring at room temperature. After completion of the addition, reaction is continued for additional 3 hours with stirring at room temperature, followed by addition of aqueous solution of ammonium chloride to decompose the unreacted Grignard reagent, the reaction mixture is extracted with ether and the ether-extract is extracted with dilute hydrochloric acid. To the acid extract is added sodium carbonate to make alkaline, followed by extraction with ether. The ether extract is washed with water, dried over anhydrous sodium sulfate and the ether is then removed by distillation. The crystalline residue is dissolved in benzene and the solution is chromatographed on silica gel. From the first fraction from the silica gel-chromatography are obtained 4.15 g. of 1-cis-3-trans-4-phenyl-1-(α-pyridyl)-1,3-butadiene melting at 91–92° C., which is recrystallized from ethanol.

Analysis.—Calculated for $C_{15}H_{13}N$: C, 86.92; H, 6.32; N, 6.76. Found: C, 86.66; H, 6.54; N, 6.84.

From the second fraction are obtained 0.68 g. of 1-trans-3-trans-4-phenyl-1-(α-pyridyl)-1,3-butadiene, melting at 121–122° C., which is recrystallized from ethanol.

Analysis.—Calculated for $C_{15}H_{13}N$: C, 86.92; H, 6.32; N, 6.76. Found: C, 86.73; H, 6.40; N, 7.05.

The cis-trans isomer may be easily converted to the trans-trans isomer by any of the conventional methods for photoisomerization, for example, by irradiating with a ultraviolet lamp or by heat.

Example 2.—4-phenylethynyl-1-(α-pyridyl)-1,3-butadiene

To a suspension of 5.25 g. of quinolizinium bromide in 50 ml. of anhydrous tetrahydrofuran is added dropwise a Grignard reagent (phenyl ethynyl magnesium bromide) prepared from 50 ml. of tetrahydrofuran, 5.7 g. of ethyl bromide, 1.22 g. of magnesium and 5.1 g. of phenyl acetylene with stirring at room temperature. After completion of the addition, the resulting mixture is heated under reflux for 1 hour. After cooling, the reaction mixture is treated in the same way as in Example 1 to give an oily substance. The oily substance is dissolved in benzene and chromatographed on silica gel.

From the first fraction are obtained 4.27 g. of 1-cis-3-trans-4-phenylethynyl-1-(α-pyridyl)-1,3-butadiene melting at 63–64° C., which is recrystallized from n-hexane.

Analysis.—Calculated for $C_{17}H_{15}N$: C, 88.28; H, 5.67; N, 6.06. Found: C, 88.54; H, 5.67; N, 6.35.

From the second fraction is obtained 1-trans-3-trans-4-phenylethynyl-1-(α-pyridyl)-1,3-butadiene melting at 91–92° C., which is recrystallized from petroleum ether.

Analysis.—Calculated for $C_{17}H_{15}N$: C, 88.28; H, 5.67; N, 6.06. Found: C, 88.01; H, 5.53; N, 6.09.

The cis-trans isomer may be converted to the trans-trans isomer by the same manner as in Example 1.

Example 3.—4-phenyl-1-(β'-methyl-α-pyridyl)-1,3-butadiene

To a suspension of 1.2 g. of 3-methylquinolizinium bromide in 20 ml. of anhydrous tetrahydrofuran is added dropwise a Grignard reagent (phenyl magnesium bromide) prepared from 30 ml. of tetrahydrofuran, 3.14 g. of bromobenzene and 0.486 g. of magnesium with stirring at room temperature. After completion of the addition, the resulting solution is stirred at room temperature for additional 6 hours and then allowed to stand overnight. The reaction mixture is treated in the same way as in Example 1 and chromatographed on silica gel.

From the first fraction are obtained 0.107 g. of 1-cis-3-trans-4-phenyl-1-(β'-methyl-α-pyridyl)-1,3-butadiene melting at 99–100° C., which is recrystallized from n-hexane.

Analysis.—Calculated for $C_{16}H_{15}N$: C, 86.84; H, 6.83; N, 6.33. Found: C, 86.67; H, 6.83; N, 6.45.

From the second fraction are obtained 0.585 g. of 1-trans-3-trans-4-phenyl-1-(β'-methyl-α-pyridyl)-1,3-butadiene melting at 122° C., which is recrystallized from n-hexane.

Analysis.—Calculated for $C_{16}H_{15}N$: C, 86.84; H, 6.83; N, 6.33. Found: C, 86.87; H, 6.87; N, 6.48.

The cis-trans isomer may be converted to the trans-trans isomer by the same manner as in Example 1.

Example 4.—4-phenyl-1-(α-pyridyl)-1.3-butadiene

To a suspension of 2.1 g. of quinolizinium bromide in 50 ml. of anhydrous ether is added dropwise a phenyllithium solution prepared from 50 ml. of ether, 1.72 g. of bromobenzene and 0.152 g. of lithium with stirring in an ice bath. After completion of the addition, the resulting mixture is stirred at room temperature for additional 3 hours, followed by treatment in the same way as in Example 1. Subsequent chromatography on silica gel affords 0.048 g. of 1-trans-3-trans-4-phenyl-1-(α-pyridyl)-1.3-butadiene melting at 121–122° C., which is identical with the product obtained from the second fraction from the chromatography in Example 1: no depression in mixed melting point.

Example 5.—1-(α-pyridyl)-1.3-pentadiene

To a suspension of 3.0 g. of quinolizinium bromide in 50 ml. of anhydrous ether is added dropwise a Grignard reagent (methyl magnesium iodide) prepared from 50 ml. of anhydrous ether, 0.75 g. of magnesium and 4.35 g. of methyl iodide with stirring at room temperature. After completion of the addition, the resulting mixture is heated under reflux with stirring for 18 hours. After completion of the reaction, the reaction mixture is treated in the same way as in Example 1. Distillation under reduced pressure at 3 mm. Hg gives 0.3 g. of 1-(α-pyridyl)-1.3-pentadiene boiling at a bath temperature of 85° C. The picrate melts at 161–162° C.

Analysis (picrate).—Calculated for $C_{16}H_{14}O_7N_4$: C, 51.34; H, 3.77; N, 14.97. Found: C, 51.05; H, 3.85; N, 15.01.

Example 6.—6-phenyl-1-(α-pyridyl)-1,3,5-hexatriene

To a suspension of 4.2 g. of quinolizinium bromide in 50 ml. of anhydrous tetrahydrofuran is added dropwise a Grignard reagent (styryl magnesium bromide) prepared from 50 ml. of tetrahydrofuran, 7.4 g. of α-bromostyrene, 0.97 g. of magnesium and a small amount of iodine with stirring at room temperature. After completion of the addition, the resulting mixture is stirred at room temperature for an additional 1 hour, followed by heating under reflux for 1 hour. The reaction mixture is treated in the same way as in Example 1 to give 1.4 g. of an oily substance. The oil substance is dissolved in benzene and chromatographed on silica gel.

From the first fraction are obtained 1.15 g. of 1-cis-3-trans-5-trans-6-phenyl-1-(α-pyridyl)-1,3,5-hexatriene melting at 93–94° C.

Analysis.—Calculated for $C_{17}H_{15}N$: C, 87.51; H, 6.48; N, 6.00. Found: C, 87.66; H, 6.40; N, 6.07.

From the second fraction is obtained the all-trans isomer melting at 174–175° C.

*Analysis.*—Calculated for $C_{17}H_{15}N$: C, 87.51; H, 6.48; N, 6.00. Found: C, 87.48; H, 6.69; N, 6.06.

The cis-trans isomer may be converted to the trans-trans isomer by the same manner as in Example 1.

We claim:
1. A process for preparing a compound having the formula

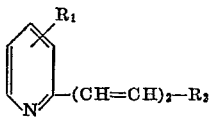

wherein $R_1$ is selected from the group consisting of hydrogen and alkyl of from 1 to 5 carbon atoms and $R_2$ is selected from the group consisting of alkyl of from 1 to 5 carbon atoms, alkenyl of from 2 to 5 carbon atoms, alkynyl of from 2 to 5 carbon atoms, phenyl, phenylalkyl of from 1 to 5 carbon atoms in the alkyl moiety, phenylalkenyl of from 2 to 5 carbon atoms in the alkenyl moiety and phenylalkynyl of from 2 to 5 carbon atoms in the alkynyl moiety which comprises reacting a compound having the formula

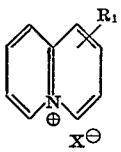

wherein X represents halogen and $R_1$ has the same meanings as described above with a compound selected from the class consisting of a compound having the formula $$R_2MgX$$

wherein $R_2$ and X have the same meaning as described above and a compound having the formula $$R_2Li$$

wherein $R_2$ has the same meanings as described above at a temperature at least as high as room temperature.

2. 4-phenylethylnyl-1-(α-pyridyl)-1,3-butadiene.
3. 6-phenyl-1-(α-pyridyl)-1,3,5-hexatriene.

References Cited
FOREIGN PATENTS
883,309   12/1961   Great Britain.

OTHER REFERENCES
Späth et al.: Ber. Deut. Chem., vol. 74, pp. 873 to 877 (1941).

Miyadera et al.: Chem. Pharm. Bull., vol. 12, pp. 1344–1951 (1964).

JOHN D. RANDOLPH, *Primary Examiner.*